No. 756,388. PATENTED APR. 5, 1904.
W. B. MAY.
MEANS FOR CONVERTING RECIPROCATORY INTO ROTARY MOTION.
APPLICATION FILED APR. 9, 1903.
NO MODEL.
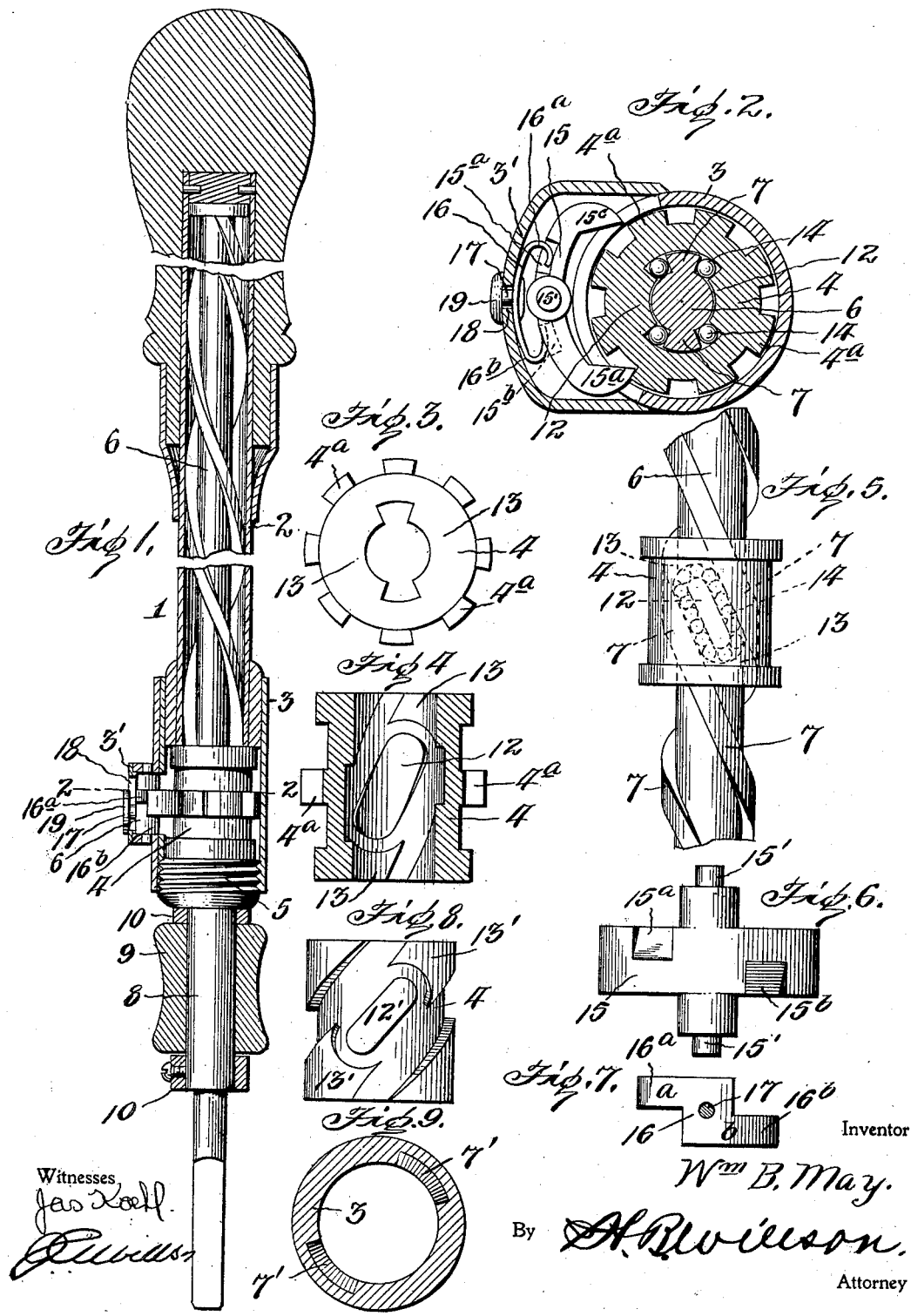
Witnesses
Inventor
Wm B. May.
By H. R. Wilson.
Attorney No. 756,388.

Patented April 5, 1904.

UNITED STATES PATENT OFFICE.

WILLIAM B. MAY, OF DENVER, COLORADO.

MEANS FOR CONVERTING RECIPROCATORY INTO ROTARY MOTION.

SPECIFICATION forming part of Letters Patent No. 756,388, dated April 5, 1904.

Application filed April 9, 1903. Serial No. 151,784. (No model.)

*To all whom it may concern:*

Be it known that I, WILLIAM B. MAY, a citizen of the United States, residing at Denver, in the county of Arapahoe and State of Colorado, have invented certain new and useful Improvements in Means for Converting Reciprocatory into Rotary Motion; and I do declare the following to be a full, clear, and exact description of the invention, such as will enable others skilled in the art to which it appertains to make and use the same.

This invention relates to means for converting reciprocatory into rotary motion, and particularly to ball-bearing means of this character for driving rotary tools and other devices.

The object is to provide simple and effective ball-bearing means for use in connection with rotary tools or shafts and their driving elements to convert reciprocatory motion into rotary motion and lessen the friction of the parts.

A further object is to provide means of this character which is simple of construction and capable of being used in many different forms and for various purposes.

With these and other objects in view the invention consists of certain novel features of construction, combination, and arrangement of parts, as will be more fully described, and particularly pointed out in the appended claims.

Figure 1 is a longitudinal sectional view of a rotary screw-driver, showing the application of the nut. Fig. 2 is an enlarged cross-section view of the same on the line 2 2 of Fig. 1. Fig. 3 is a top plan view of the nut. Fig. 4 is a longitudinal vertical section of the nut removed. Fig. 5 is an enlarged elevational view of the nut and a portion of the shaft, the ratchet-teeth of the nut being omitted, showing in dotted lines the bearing-balls and ball-race construction. Fig. 6 is a rear elevation of the pawl. Fig. 7 is a similar view of the pawl adjusting and locking device. Fig. 8 is a side view of a modified form of the nut, and Fig. 9 is a cross-sectional view of the tube in which the same is adapted to work.

In the drawings, 1 denotes a screw-driver comprising a tubular handle or casing 2, having formed on its lower end a housing 3, in which is rotatably mounted a nut 4, which has a pawl-and-ratchet engagement with said housing, as hereinafter described, and is held in place by a collar 5, having a screw-threaded engagement with the outer end of said housing.

6 denotes a rod or shaft on which is formed a double spiral or worm-thread 7, and on the lower end of the shaft 6 is formed the chuck 8, which holds the tool or bit.

9 denotes a sleeve or handhold which is loosely fitted on the lower end of the shaft 6 and is held in place by collars 10.

The nut 4 consists, preferably, of a tubular body which may be cast solid, as shown, or made in halves and suitably connected together by rings or bands.

On the inner walls of the tubular nut are formed diagonally-arranged lugs or bars 12, the ends of which are rounded, and at the ends of the bars or lugs 12 are formed other lugs 13, arranged in line with the bars 12 and spaced from the ends of the same. The lugs 13 are of considerably greater width than the lugs 12 and the ends of the same adjacent to the ends of the lugs 12 are arc-shaped or curved concentrically with the ends of the lugs 12. The lugs 12 and 13 on one side of the nut are arranged in a diagonally opposite direction from the lugs on the opposite side of the nut, and when the nut is in engagement with the threaded rod or shaft the lugs 12 and 13 fit between the threads 7 and, in conjunction with the said threads, form ball-races in which are disposed bearing-balls 14. In their course of travel the balls in each raceway first travel one side channel between the lug 12 and one thread 7, then around one end of the race between the lug 12 and one of the lugs 13, then along the opposite channel of the race between the opposite side of lug 12 and the other thread 7, and, finally, back to the first-named channel around at the opposite end of the race between the other end of lug 12 and other adjacent lug 13. This is the operation of the balls when the nut is reciprocated a certain distance, the balls first traveling in one direction and then in the reverse direction as the nut moves back and forth.

When the nut is reciprocated a less distance, the balls of course travel first in one direction a part of the raceway and then travel back, as will be readily understood.

In Figs 8 and 9 the arrangement and the form of the nut is somewhat different. In this instance the lugs 12' and 13' are formed on the side of the nut, and the inner side of the tube is spirally grooved or interiorly threaded, as shown at 7', said grooves or threads 7' forming, in conjunction with the lugs 12 and 13, ball-races in which the balls are adapted to run. It will be understood that this construction is designed to effect the operation of an outer tube or sleeve or hollow shaft, such as tube 3, instead of an inner member, such as shaft 6 in Figs. 1 to 7, inclusive.

In the application of the nut, as shown in Figs. 1, 2, and 5, the threaded rod or shaft 6 is engaged with the nut and the balls dropped into place. The rod and nut are now inserted into the tubular handle, the nut assuming its position in the tube or housing 3 and being held therein by collar 5. The nut in this instance is provided with a centrally-disposed annular series of teeth $4^a$, which are adapted to be engaged by either one of the points or detents $15^a$ $15^b$ of a double pivoted spring-actuated pawl 15, which is adapted to engage the nut to prevent the same from turning when projected to drive a screw, but which will allow the nut to turn loosely in the housing when retracted, as will be understood, means being also provided to shift the spring and cause one point or the other of the pawl to engage the nut, thereby reversing the working of the parts from left to right or from right to left, as the case may be. As shown, the pawl 15 swings on its central pivoting-trunnions 15' and is provided on opposite sides of its center with recesses $15^c$ and $15^d$, one opening through the upper and the other through the lower face of the pawl, the bottom walls of said recesses being inclined, as clearly shown in Figs. 2 and 6. The pawl-spring 16 occupies a chamber 3' on the tube or housing 3 and comprises a segmental strip of spring metal having arms $a$ and $b$ projecting in opposite directions and disposed in different horizontal planes, said arms being formed with bent or doubled engaging ends $16^a$ and $16^b$ to seat within the recesses $15^c$ and $15^d$ of the pawl. The spring is provided at the center with a stem 17, projecting to the exterior through a slot 18, formed in the said chamber 3', said stem being vertically adjustable in said slot and having a knob or finger-piece 19, by which the pawl may be raised and lowered. Upon raising the pawl it will be understood that the resilient end $16^a$ of the spring will move out of recess $15^c$, while the opposite end $16^b$ of said spring will seat in the other recess $15^d$ and exert spring-pressure against the inclined base thereof, thus causing pawl end $15^d$ to be projected into engagement with the teeth $4^a$ and pawl end $15^c$ to be retracted. A reverse movement of the spring will, on the other hand, move the end $16^b$ downward out of recess $15^b$ and move the end $16^a$ into recess $15^a$, thereby projecting pawl end $15^c$ into engagement with teeth $4^a$ and retracting pawl end $15^d$. In this manner action of the pawl may be quickly reversed to rotate the shaft in either direction, and it will be observed that the coiled or bent ends of the spring not only project and lock the pawl in adjusted position, but also give the necessary spring action to allow the pawl to yield to ride in one direction over the teeth $4^a$. It will be understood that the application of the nut to a screw-driver of this kind and as just described is simply given as an illustration of one use to which the nut may be put and that the same may be advantageously used for many other purposes and in different forms.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

1. Means for converting reciprocatory into rotary motion comprising a reciprocatory part and a rotary part, one of said parts being provided with parallel spiral threads and the other part with a projection to fit between said threads and with other projections spaced from the edge of the first-named projection and also adapted to fit between the threads, thus forming a raceway, and balls adapted to travel said raceway, substantially as described.

2. A device of the character described, comprising coöperating parts, one of said parts being provided with double spiral threads, and the other with a diagonal projection entering between the threads and other projections disposed in alinement with and spaced from the ends of the first-named projection and also extending between the threads, thereby forming an elongated channel or raceway and balls adapted to travel said raceway.

3. In a device of the character described, the combination with a spirally-threaded shaft, of a nut provided with means coacting with said thread to form a raceway, balls adapted to travel in said raceway, said nut also being provided with ratchet-teeth, a double pawl adapted to engage said ratchet-teeth, and a presser-spring adapted to be adjusted to throw one member of the pawl into and the other out of action and to transfer spring-pressure to the acting member, substantially as described.

4. In a device of the character described, the combination with a spirally-threaded shank, and a nut thereon provided with means coacting with said spiral thread to form a raceway, and having ratchet-teeth, balls traveling in said raceway, a double pawl adapted to engage with said ratchet-teeth and provided with reversely-extending recesses having inclined walls, and a spring having resilient ends arranged in different planes and adapted to be adjusted to move one end into engagement with one pawl-recess and the other out of engagement with the other pawl-recess, and vice versa, to project one or the other of the members of the pawl and to exert a locking and spring-pressure action on the acting member.

In testimony whereof I have hereunto set my hand in presence of two subscribing witnesses.

WILLIAM B. MAY.

Witnesses:
  EVELYN BEAUCHAMP,
  S. J. RUHL.